United States Patent [19]
Taylor

[11] 3,776,036
[45] Dec. 4, 1973

[54] FLUID FLOWMETERS

[76] Inventor: Lionel Ivor Alfred Taylor,
Copythorne House, Copythorne,
Southampton, England

[22] Filed: Feb. 29, 1972

[21] Appl. No.: 230,381

[52] U.S. Cl............................ 73/210, 73/114, 73/228
[51] Int. Cl. ............................................. G01f 1/00
[58] Field of Search................... 73/228, 114, 210, 73/207, 208

[56] References Cited
UNITED STATES PATENTS

| | | | |
|---|---|---|---|
| 3,673,863 | 7/1972 | Spacek | 73/209 X |
| 3,115,777 | 12/1963 | Hochreifer | 73/228 X |
| 2,984,148 | 5/1961 | Vollmer | 73/DIG. .011 |

*Primary Examiner*—Jerry W. Myracle
*Attorney*—Emory L. Groff et al.

[57] ABSTRACT

A fluid flowmeter for converting a fluid flow into an electrical output signal, includes a float which is moved by the fluid flow against the action of a spring, to vary the amount of light transmitted for a light source to a photosensitive device. The flowmeter is primarily for use in a miles-per-gallon meter for an automobile, the output signal from the flowmeter being processed with a signal indicative of the speed of an automobile to provide a miles-per-gallon indication.

11 Claims, 3 Drawing Figures

FLUID FLOWMETERS

SUMMARY OF THE INVENTION

This invention relates to a fluid flowmeter for providing an electrical signal having a predetermined relationship to the rate of flow of a fluid through, for example, a pipeline.

Throughout this specification the term "fluid" is used to include liquid, gaseous and vapourous media.

According to the present invention a fluid flowmeter comprises a body member of translucent material providing a passageway for connection as part of a pipeline through which in use a fluid, the flow of which is to be metered, passes; a light opaque float positioned in the passageway and supported on a cantilever spring relative to the body member, the float having a cut-out or translucent portion defining a light transmission path extending transversely of the passageway; a light source on one side of the passageway and in the light transmission path; and a photosensitive device in the light transmission path on the opposite side of the passageway to the light source.

With such a flowmeter, in use the float is moved against the action of the cantilever spring by an amount dependent upon the rate of flow of fluid through the passageway, such movement of the float causing variation in the amount of light passing from the light source through the cut-out or translucent portion of the float to the photosensitive device, whereby the photosensitive device is casused to provide a signal indicative of the rate of flow of fluid through the passageway at any instant.

DESCRIPTION OF THE DRAWINGS

One embodiment of a fluid flow meter in accordance with the present invention will now be described by way of example with reference to the drawings in which.

DESCRIPTION OF PREFERRED EMBODIMENT

Figure 1:
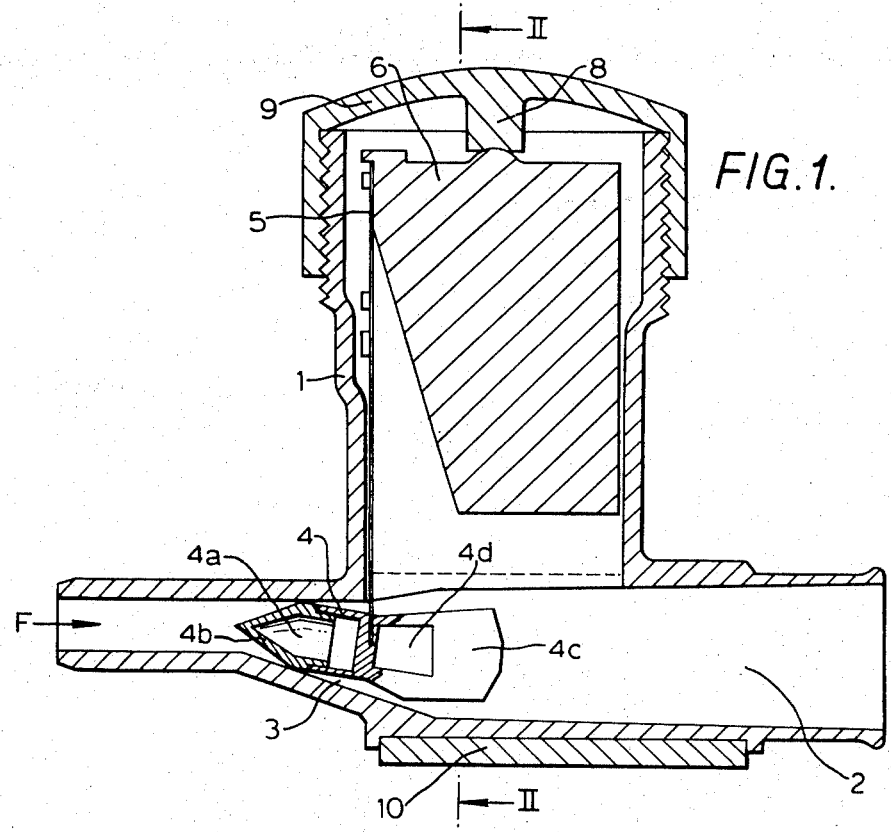
FIG. 1 is a longitudinal section through the flowmeter on the line I — I of FIG. 2.
Figure 3:
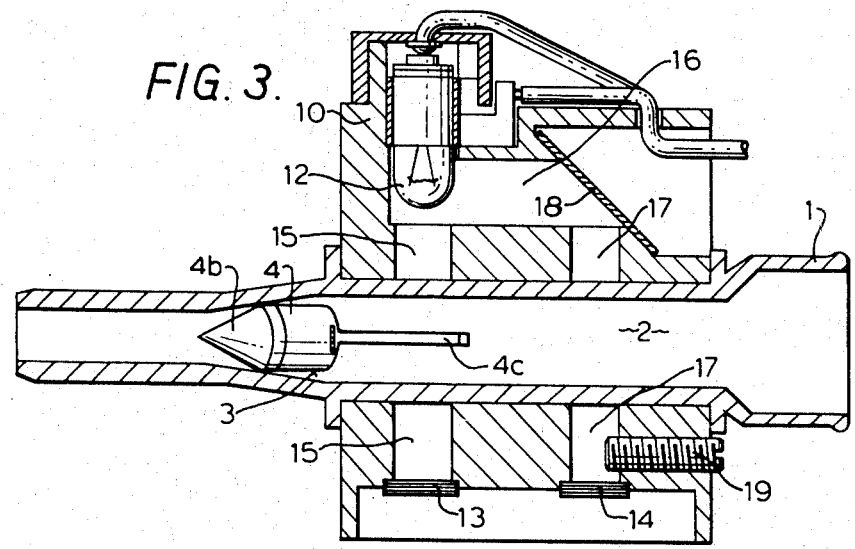
FIG. 3 is a plan view on the line III — III of FIG. 2.
Figure 2:
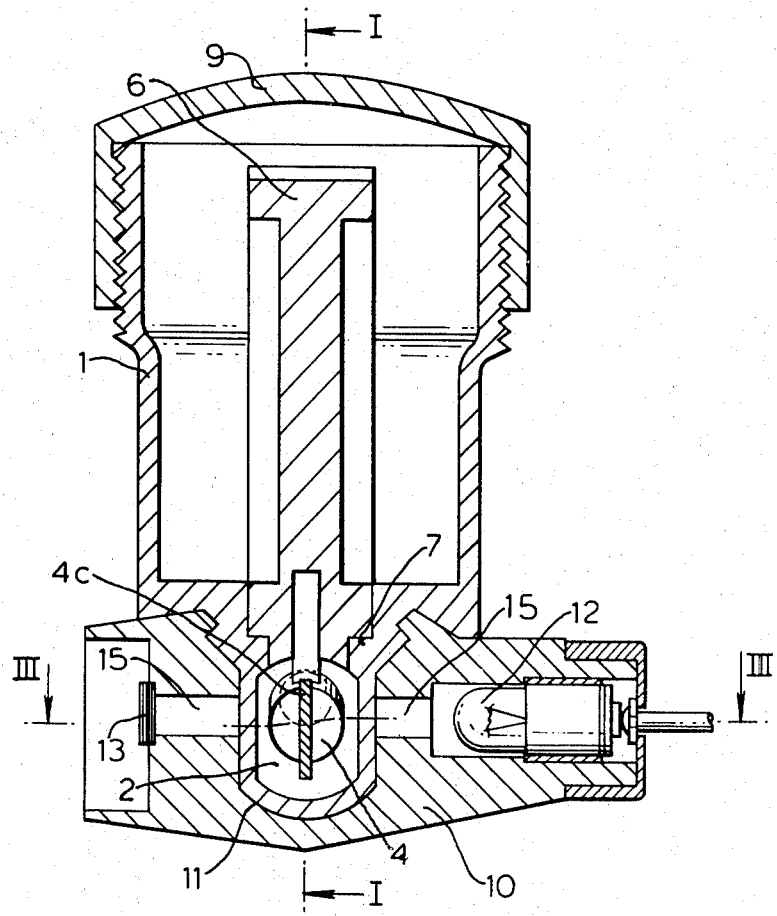
FIG. 2 is a cross-section through the flowmeter on the line II — II of FIG. 1.

As shown in the drawings the flowmeter comprises a body member 1 of translucent plastics material providing a passageway 2 for connection as part of a pipeline through which, in use, a fluid the flow of which is to be metered, passes. The passageway 2 has a tapered portion 3, and a hollow float 4 of black plastics material is positioned in the passageway 2 at the tapered portion 3 thereof. The float 4 is carried at one end of a cantilever metal spring 5 the other end of which is secured to a glss filled nylon support member 6 by bosses on the support member 6 engaging in holes in the spring 5. The lower end of the support member 6 (as seen in FIGS. 1 and 2) rests on ledges 7 in the body member 1. The support member 6 is held down against the ledge 7 by a boss 8 on a cap 9 screw-threaded onto the body member 1 engaging the top of the support member 6. The use of glass filled nylon for the support member 6 is prerferred in order to keep the coefficient of thermal expansion of the support member 6 as near as possible to that of the spring 5.

The float 4 comprises a hollow cylindrical portion 4a having a hollow conical nose 4b at one end and a flat tail 4c at the other end. The tail 4c of the float 4 has a cut-out 4d therein.

As shown in FIG. 1, the float 4 is positioned in the tapered portion 3 of the passageway 2 with its nose 4b pointing into the tapered portion 3, and is held by the spring 5 out of contact with the body member 1.

The float 4 is preferably constructed such that the combined weight of the float 4 and the portion of the spring 5 which, in use of the flowmeter, is in the fluid being metered, is such that the float 4 is neutrally buoyant in the fluid. This enables the flowmeter to be mounted in use, in any desired position, that is with the channel 2 extending in any desired direction.

The flowmeter also includes a black plastics material saddle member 10 formed with a slot 11 in which the body member 1 is removably received and held. The saddle member 10 carries a light source in the form of an electrical bulb 12, and two photosensitive devices 13 and 14. The bulb 12 and the photosensitive devices 13 and 14 are positioned on opposite sides of the slot 11 with the photosensitive device 13 transversely aligned with the bulb 12.

The saddle member 10 is also formed with interior passageways 15, 16 and 17 serving to devine light transmission paths. The paths 15 and 16 are illuminated directly by the bulb 12, and the path 17 is illuminated from the path 16 by means of a mirror 18 mounted across one corner of the saddle member 10. A grub screw 19 is screwed into a threaded hole in the saddle member 10 with its inner end projecting into the light path 17 between the mirror 18 and the photosensitive device 14, the grub screw serving as a means of controlling the amount of light transmitted to the photosensitive device 14 along the light path 17.

In the use of the flow meter, with the body member 1, containing the float 4, mounted on the saddle member 10, the cutlout 4d of the float 4 is positioned in the light path 15 between the bulb 12 and the photosensitive device 13. The light path 17 passes through the body member 1 and the fluid being metered.

The flow meter is operated as follows. With the body member 1 mounted on the saddle member 10 as described above, the passageway 2 is connected in a pipeline through which the fluid, the flow of which is to be metered, passes in the direction of the arrow F in FIG. 1, the bulb 12 is illuminated and the photosensitive devices 13 and 14 are connected to an out-put circuit arrangement (not shown). When the fluid is flowing through the passageway 2, the float is moved to the right as seen in FIG. 1 against the action of the spring 5, the amount of such movement of the float 4 being dependent upon the rate of flow of the fluid through the passageway 2. The movement of the float 4 moves the cut-out 4d thereof relative to the light path 15 and causes part of the remainder of the float 4 to block off part of the light path 15. Thus, the amount of light transmitted along the light path 15 from the bulb 12 to the photosensitive device 13 is dependent upon the movement of the float 4 and thus upon the rate of flow of the fluid through the passageway 2. The output signal from the photosensitive device 13 is thus indicative of the rate of lfow of the fluid through the passageway 2.

The photosensitive device 14 serves to calibrate the flowmeter and to give an indication of variations in the light output of the bulb 12, due for example to a change in the supply voltage or a change in the efficiency of the bulb 12, and also to give an indication of a variation in the translucency of the fluid flowing through the passageway 2. An initial balance between the output signals from the two photosensitive devices 13 and 14 is obtained by appropriate adjustment of the grub screw 19.

The flowmeter described above is particularly suitable for use in a "miles-per-gallon meter" for use in an automobile to give an indication of the miles-per-gallon performance of the autobobile at any instant. For such use the pssageway 2 is connected in the engine fuel supply pipeline of the automobile whereby the output signal from the photosensitive device 13, corrected by the output signal from the photosensitive device 14, will indicate at any instant the rate of usage of fuel at that instant. The corrected output signal from the photosensitive device 13 is processed in electric circuitry together with a signal indicative of the speed of the automobile at any instant to provide a third signal indicative of the miles-per-gallon performance of the automobile at any instant, the third signal being fed to a meter to provide a visual indication of the miles-per-gallong performance of the automobile at any instant. The speed signal indicative of the speed of the automobile at any insant can be derived from a mechanical speed inciating means of the automobile, by means of a photoelectric device comprising a light source, a photosensitive device positioned to receive light from the light source, and mechanical pulsing means to pulse the transmission of light from the light source to the photosensitive device the mechanical pulsing means being driven by the mechanical speed indicating means of the automobile whereby the repetition frequency of the light pulse transmitted from the light source to the photosensitive device and thus the speed indicating output signal from the photosensitive device are dependent at any insant upon the speed of the automobile at that instant.

Various forms of electric circuitry suitable for processing the speed signal and the output signal from the fuel flowmeter as necesary, will be apparent to those skilled in the art and none will therefore be described herein.

I claim:

1. A fluid flowmeter comprising a body member of translucent material providing a passageway for connection as part of a pipeline through which in use a fluid, the flow of which is to be metered, passes; a light-opaque float positioned in the passageway and supported on a cantilever spring relative to the body member, the float having a cut-out or translucent portion defining a light transmission path extending transversely of the passageway; a light source on one side of the passageway and in the light transmission path; and a photosensitive device in the light transmission path on the opposite side of the passageway to the light source.

2. A flowmeter as claimed in claim 1, in which the passageway has a tapered portion in which the float is positioned.

3. A flowmeter as claimed in claim 2, in which the float comprises a hollow cylindrical portion having a hollow conical nose at one end and a flat tail at the other end, the tail having the cut-out or translucent portion therein.

4. A flowmeter as claimed in claim 1, in which the cantilever spring is secured to a support member which is rigidly positioned in the body member between a ledge or ledges in the body member and a cap screw-threaded onto the body member.

5. A flowmeter as claimed in claim 4, in which the support member is of glass filled mylon.

6. A flowmeter as claimed in Claim 1, including a further photosensitive device arranged in a second light transmission path extending from the light source and through the passageway parallel to the first mentioned light transmission path, but not through the cut-out or translucent portion of the float.

7. A flowmeter as claimed in claim 6, including a mirror by means of which, in use, light from the light source is transmitted to the further photosensitive device.

8. A flowmeter as claimed in claim 7, including correction means to vary the amount of light transmitted from the light source to the further photosensitive device by altering the cross-sectional area of the second light transmission path at a position therealong.

9. A flowmeter as claimed in claim 8, including a saddle member formed with a slot in which the body member is removably received and held, the light source and the first mentioned photosensitive device being mounted on the saddle member at opposite ends of a passageway therein defining the first mentioned light transmission path.

10. A flowmeter as claimed in claim 9, in which the mirror and the further photosensitive device are carried by the saddle member, the mirror and further photosensitive device being mounted at opposite ends of a second passageway extending through the saddle member parallel to the first mentioned passageway therein; and defining the second light transmission path.

11. A flowmeter as claimed in claim 10, in which the correction means comprises a screw threadably engaged in the saddle member with one end extending or able to extend into the second passageway.

* * * * *